Patented June 7, 1949

2,472,133

UNITED STATES PATENT OFFICE 2,472,133

THIOPHANTHRAQUINONE DERIVATIVES

Viktor Weinmayr, Pitman, N. J., assignor to E. I. du Pont de Nemours & Company, Wilmington, Del., a corporation of Delaware No Drawing. Application March 20, 1947, Serial No. 736,125

2 Claims. (Cl. 260—329)

This invention relates to new thiophanthraquinone derivatives, and more particularly to the preparation of thiophanthraquinone-2-carboxylic acid as a new compound which has the following formula:

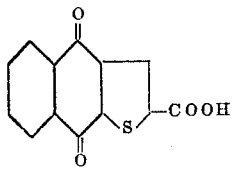

and to a process for preparing the same.

The term "thiophanthraquinone" is employed in the naming of this compound in view of the original name used by Scholl and Seer in Ann. 394, 131 (1912), who designated the corresponding unsubstituted hydrocarbon compound "thiophanthracene."

It is an object of this invention to prepare thiophanthraquinone-2-carboxylic acid as an intermediate particularly useful as a starting material for the preparation of dyestuffs and other compounds. A further object of the invention is to provide a commercially feasible process for the preparation of the thiophanthraquinone-2-carboxylic acid.

I have found that thiophanthraquinone-2-carboxylic acid may be produced by heating thiophanthraquinone with carbon tetrachloride in the presence of a catalyst to temperatures of about 200° C. While a mixture of unreacted thiophanthraquinone, 2-trichloromethylthiophanthraquinone and 2,2'-dithiophanthraquinonyl-di-chloromethane is obtained, I have found that either acid or caustic alkali hydrolysis will convert these chloro compounds to thiophanthraquinone-2-carboxylic acid and 2,2'-di-thiophanthraquinonyl ketone. These resulting compounds can be separated from each other by extraction with alkalies and crystallization.

Both the thiophanthraquinone-2-carboxylic acid and the 2,2'-di-thiophanthraquinonyl ketone are new compounds and are suitable for use as intermediates in the synthesis of other compounds, more particularly dyestuffs.

The following example is given to illustrate the invention. The parts used are by weight.

Example 125 parts of thiophanthraquinone, 700 parts of carbon tetrachloride and 1 part of copper bronze are heated in an autoclave at 200° C. for 10 hours. The charge is then cooled, and the hydrochloric acid which has formed is vented. Forty (40) parts of sodium hydroxide and 600 parts of water are then added, the unreacted carbon tetrachloride is distilled off, and the remainder of the charge is heated to the boil for about 48 hours.

The solution is filtered to remove unreacted thiophanthraquinone and di-thiophanthraquinonyl ketone, and the filtrate is acidified with hydrochloric acid. The crude thiophanthraquinone-2-carboxylic acid is redissolved by heating it in water in the presence of magnesium oxide. The solution of the magnesium salt of the thiophanthraquinone-2-carboxylic acid is acidified, and a crude thiophanthraquinone-2-carboxylic acid melting at 280°–282° C. is obtained. It may be crystallized from 7 parts of nitrobenzene or from 130 parts of chlorobenzene per part of crude product to give a relatively pure product in the form of yellow crystals melting at 289° to 290° C. The thiophanthraquinone-2-carboxylic acid is soluble in concentrated sulfuric acid with a yellow color and forms a red vat in alkaline hydrosulfite. Based on a mixed melting point determination, this product is identical with the thiophanthraquinone-2-carboxylic acid obtained when 2-methyl thiophanthraquinone (see co-pending application of Lee and Weinmayr Serial No. 723,668) is oxidized with chromic acid in acetic acid.

The above preferred procedure may be varied in many ways. Being essentially a Friedel-Crafts type condensation, it will proceed when the well-known catalysts promoting that reaction are used. Thus, instead of using 1 part of copper bronze, which is a copper powder of a very small particle size, anhydrous aluminum chloride, or its eutectic mixtures with sodium chloride and potassium chloride, may be used. The amounts of these catalysts may vary within reasonable limits, as from 1 to 10 parts per 100 parts of thiophanthraquinone. As pointed out above, the reaction produces a mixture of unreacted thiophanthraquinone, trichloromethyl-thiophanthraquinone and di-thiophanthraquinonyl-dichlormethane. When the amount of catalyst is increased or the reaction temperature is raised and the reaction time is prolonged, more of the latter compound is formed. Therefore, by adjusting the amount of catalyst, the reaction temperature and condensation time, the ratio of the three compounds in the mixture can be varied.

While the preferred reaction temperature is about 200° C., it may be varied from 150° to 220° C.

I claim:
1. Thiophanthraquinone-2-carboxylic acid.
2. The process for preparing thiophanthraquinone-2-carboxylic acid which comprises heating thiophanthraquinone with carbon tetrachloride in the presence of a Friedel-Crafts condensation catalyst at temperatures of from 150° to 220° C., subjecting the resulting mass to hydrolysis with caustic alkali, and, after filtering to remove the unreacted thiophanthraquinone and the dithiophanthraquinonyl ketone, acidifying the filtrate and separating the thiophanthraquinone-2-carboxylic acid which is precipitated.

VIKTOR WEINMAYR.

No references cited.